United States Patent [19]

Marek et al.

[11] 3,998,713

[45] Dec. 21, 1976

[54] PROCESS FOR CONTROLLED RADIATION POLYMERIZATION AND COPOLYMERIZATION OF MONOOLEFINIC AND DIOLEFINIC MONOMERS USING METALLIC CATALYSTS

[75] Inventors: Miroslav Marek; Ludek Toman, both of Prague, Czechoslovakia

[73] Assignee: Ceskoslovenska akademie ved, Prague, Czechoslovakia

[22] Filed: Aug. 5, 1971

[21] Appl. No.: 169,506

[30] Foreign Application Priority Data

Aug. 14, 1970 Czechoslovakia ............... 5648-70

[52] U.S. Cl. .................... 204/159.24; 526/123; 526/124; 526/163; 526/332; 526/339; 526/346; 526/347; 526/349; 526/350; 526/295

[51] Int. Cl.$^2$ ............... C08F 2/46; C08F 4/00

[58] Field of Search ............... 204/159.15, 159.24

[56] References Cited

UNITED STATES PATENTS

| | | | |
|---|---|---|---|
| 2,845,414 | 7/1958 | Schutze | 204/159.24 |
| 2,921,006 | 1/1960 | Schmitz et al. | 204/159.15 |
| 2,943,987 | 7/1960 | Anderson | 204/159.24 |
| 2,968,652 | 1/1961 | Mertes | 204/159.24 |
| 3,105,024 | 9/1963 | Schutze et al. | 204/159.24 |
| 3,134,642 | 5/1964 | Mertes | 204/159.24 |
| 3,179,580 | 4/1965 | Fukui et al. | 204/159.24 |
| 3,551,235 | 12/1970 | Bassemir et al. | 204/159.15 |

*Primary Examiner*—Richard B. Turer

[57] ABSTRACT

The invention is for a process for the controlled polymerization and copolymerization of monoolefinic and diolefinic monomers, which are able to polymerize by a cationic mechanism and particularly for the polymerization of isobutylene and copolymerization thereof with butadiene in the production of vulcanizable butyl rubber. The polymerization reaction is initiated by halides of tetravalent vanadium, titanium and zirconium. In the presence of activating agents, which are chosen from alkali metals, alkaline earth metals, their amalgams and the hydrogen compounds (hydrides) of the metals of Groups I, II, III and IV of the Periodic Table accelerated by irradiation, particularly by light. The polymerization may be carried out at 0° C to – 140° C with the molecular ratio of the initiator to the activating agent ranging from 100 to 0.01 and its rate is controlled by the intensity of irradiation and by dosing of the catalyst components.

6 Claims, No Drawings

PROCESS FOR CONTROLLED RADIATION POLYMERIZATION AND COPOLYMERIZATION OF MONOOLEFINIC AND DIOLEFINIC MONOMERS USING METALLIC CATALYSTS

BACKGROUND OF THE INVENTION

Isobutylene is one of the most important monomers which polymerize by a cationic mechanism. Its polymers and particularly copolymers with dienes are the important industrial elastomers. The high molecular weight polymerization of isobutylene and its copolymerization with dienes to butyl rubber are commonly catalyzed by aluminium chloride or boron trifluoride at low temperatures, about −80° to −100° C. At higher temperatures the polymers and particularly the copolymers formed have lower molecular weights. Such copolymers with dienes are not suitable for further processing by vulcanization.

The disadvantage of the classic process for producing of butyl rubber is the high polymerization rate at the given low temperature. The high rate of polymerization prevents carrying out the polymerization at a high concentration of monomers or without solvent, with sufficient heat removal and protection from severe overheating of the polymerization mixture.

The aforesaid effect causes a decrease of the average molecular weight and broadening of the distribution of molecular weights in the product. For this reason, the process is carried out in dilute solutions with vigorous stirring positive cooling and with considerable volumes of auxiliary solvents, mostly chlorinated solvents, to assure solubility of the aluminium chloride catalyst. The process includes the recycling and purification of solvents. The inevitable low temperature necessary, which is energetically unsuitable, the purification of auxiliary solvents and the corrosion of plant apparatus by chlorinated solvents are the main negative characteristics of the known process for the production of butyl rubber.

Another limiting factor in the known low-temperature process for the production of butyl rubber is the choice of a suitable diene co-monomer. Many industrial processes are based on copolymerization of isobutylene with isoprene, in spite of the fact, that butadiene is a cheaper and more accessible diene than isoprene. Isoprene is used for its relatively more convenient copolymerization parameter to isobutene than butadiene. The copolymerization parameters for isoprene - isobutylene are essentially temperature independent, while the parameter of butadiene in copolymerization with isobutylene decreases with decreasing temperature. This prevents the preparation of butyl rubber by copolymerization of butadiene and isobutylene at the temperature condition of the known process, that is, at about −100° C.

SUMMARY OF THE INVENTION

In accordance with the present invention there is provided a process for controlled polymerization and copolymerization of monoolefinic and diolefinic monomers capable of polymerizing by a cationic mechanism and in particular the polymerization of isobutylene and copolymerization with butadiene to butyl rubber comprising the polymerization reactions by halides of Vanadium, Titanium and Zirconium in the present of activating agents and accelerating the polymerization by light.

DESCRIPTION OF THE PREFERRED EMBODIMENTS

According to Czechoslovak Patent Applications PV 2,712-70, PV 2,792-70, PV 3,705-70 and PV 4,005-70, the polymerization and copolymerization of monoolefinic diolefinic monomers are initiated and accelerated by light while they are catalyzed by halides of Vanadium, Titanium and Zirconium. The presence of alkali metals, alkaline earth metals, their amalgams with mercury and also the presence of hydrogen compounds (hydrides) of metals of Groups I, II, III and IV of the Periodic Table has a favourable influence upon the course of polymerization catalyzed by halides mentioned. The aforesaid activating agents increase the polymerization rate and also the molecular weight of the polymers and copolymers so formed. The influence of light is much more effective than in the polymerization or copolymerization by the mentioned halides themselves, as follows from the data shown in Table set out below. The molecular ratio of metal halide to the activating agents ranges from 100 to 0.01 part metal halide to 1.0 part activating agent. The polymerization is preferably carried out at the temperatures in a range of about 0° to about −140° C.

The reactions carried out with the aforementioned catalytic systems take place a considerable rates at much lower concentrations of catalyst and are accelerated by short-term irradiation by ultraviolet, visible, or infrared light (several seconds only). Alkali metals and alkaline earth metals may be present in the reaction system in the form of a wire, rod or fine suspension, or they can be employed in a liquid state (e.g. as sodium-potassium alloys). The alkali metal malgams when used are preferably dispersed in the reaction medium by vigorous stirring. The hydrogen compounds of metals (hydrides) are used as fine suspensions in the reaction medium. The individual catalytic components can be added to the reaction mixture in an arbitrary sequence or as a previously blended mixture. Hydrides and alkali metals are preferably added as the first component, since they act as drying agents and free the system from traces of moisture. Polymerizations and copolymerizations with the described catalyst systems can be carried out to achieve a high conversions of monomers.

The polymerization rate can be safely controlled by dosing the catalyst components and by irradiation of the reaction mixture with light. In this way overheating is prevented

TABLE

Influence of light and activating agents on polymerizations catalyzed by vanadium (IV) chloride

| Catalyst | Conc. of VCl$_4$ (mole per g of polymerization mixture) | Composition of monomer mixture | Irradiation with elec. lamp | Total time of polymerization | Polymer yield % | Molecular weight |
| --- | --- | --- | --- | --- | --- | --- |
| VCl$_4$ | $1.07 \times 10^{-5}$ | 100% isobutylene | 60 min. | 60 min | 45 | 230,000 |

TABLE-continued

Influence of light and activating agents on polymerizations catalyzed by vanadium (IV) chloride

| Catalyst | Conc. of $VCl_4$ (mole per g of polymerization mixture) | Composition of monomer mixture | Irradiation with elec. lamp | Total time of polymerization | Polymer yield % | Molecular weight |
|---|---|---|---|---|---|---|
| $VCl_4$ | $1.48 \times 10^{-5}$ | isobutylene + 24.3% w/w butadiene | 200 W 90 min 200 W | 90 min | 32 | 400,000 |
| $VCl_4 + CaH_2$ | $2.30 \times 10^{-6}$ | 100% isobutylene | 5 sec 500 W | 40 min | 79 | 243,000 |
| $VCl_4 + NaH$ | $2.81 \times 10^{-6}$ | isobutylene + 17.2% w/w butadiene | 5 sec 500 W | 90 min | 62 | 517,000 |
| $VCl_4 + Na$ wire | $3.25 \times 10^{-6}$ | isobutylene + 11.5% w/w butadiene | 5 sec 500 W | 90 min | 69 | 556,840 |

Polymerizations and copolymerizations were carried out at temperature $-40°$ C. by effective heat removal. In addition, the process of controlled polymerization and copolymerization can be successfully applied to polymerization of the monomer mixture itself, without auxiliary solvents. It is obvious, that butyl rubber can be produced according to the invention at higher temperatures $-40°$ to $-30°$ C, when the copolymerization parameter of butadiene to isobutylene has a convenient value.

The new, economically advantageous, production of butyl rubber in accordance with this invention, is based on the high operational temperature, which is energetically suitable, the polymerization is performed without an auxiliary solvent, high conversions to the polymer (70 to 80%), the effective drying of the monomers directly by the catalyst component (alkali metal or hydride), and the use of the more accesible and cheaper co-monomer - butadiene. The polymerizations and copolymerizations were performed with isobutylene, styrene, α-methylstyrene, vinylether, butadiene, isoprene, dimethallyl, 2,3-dimethylbutadiene-1,3, piperylene, cyclohexadiene, cyclopentadiene, chloroprene, and with alkoxybutadienes.

The solution polymerizations can be carried out in aliphatic, aromatic or halogenated solvents.

The performance and the results of the invented process are illustrated in the following several examples, without limiting its scope. A all of the following exemplary polymerizations were carried out in an all-glass reactor equipped with a magnetic stirrer at dry condition and in the atmosphere of oxygen-free argon.

EXAMPLE I

Polymerization of 22 grams of isobutylene was carried out in daylight at $-40°$ C without an auxiliary solvent. Vanadium chloride (Group IV) and a suspension of sodium hydride in n-heptane were used as the catalyst components. The polymerization was stopped after 10 minutes by the addition of ethanol and at the conversion to polymer was 87%. The consumptions of the catalyst components were $5.86 \times 10^{-5}$ mole of $VCl_4$ and $1.57 \times 10^{-4}$ mole of NaH. The molecular weight of the polymer was 213,000.

EXAMPLE II

Polymerization of 23 grams of isobutylene was carried out without auxiliary solvent at $-40°$ C. Vanadium chloride (Group IV) and a suspension of lithium-aluminium hydride in n-heptane were used as the catalyst components. The reaction mixture was illuminated, 25 minutes after dosing of the catalyst components, for 10 seconds with 200 Watt electric lamp. The polymerization was stopped by an addition of ethanol 90 minutes after dosing of the catalyst components. The yield of polymer was 87%. The consumptions of the catalyst components were $5.86 \times 10^{-5}$ mole of $VCl_4$ and $1.67 \times 10^{-4}$ mole of lithium-aluminum hydride. The molecular weight of the polymer was 190,200.

EXAMPLE III

Polymerization of 26 grams of isobutylene was carried out without auxiliary solvent at $-40°$ C. Titanium tetrachloride and calcium hydride were used as the catalyst components. The reaction mixture was illuminated after dosing of the catalyst components with 500 Watt electric lamp for 30 minutes. Then the lamp was switched off and the polymerization was permitted to take place for a further 30 minutes in daylight. The reaction was stopped by the addition of 0.5 ml of ethanol and the achieved yield of the polymer was 39%. The consumptions of the catalyst components were $1.5 \times 10^{-4}$ mole of $TiCl_4$ and $3.6 \times 10^{-4}$ mole of $CaH_2$. The molecular weight was 360,000.

EXAMPLE IV

Polymerization of 24 grams of isobutylene was carried out without auxiliary solvent at $-40°$ C. Titanium tetrachloride and sodium hydride were used as the catalyst components. The polymerization proceeded very slowly after dosing of the catalyst components and, therefore, the reaction mixture was, after 1 hour, illuminated with a 500 Watt electric lamp for 45 minutes. The reaction was stopped by an addition of 0.5 ml of ethanol and the yield of the polymer was 4,2%. The consumptions of the catalyst components were $5.7 \times 10^{-5}$ mole of $TiCl_4$ and $1.8 \times 10^{-4}$ mole of NaH. The polymer had a molecular weight of 340,500.

EXAMPLE V

Polymerization of 24 grams of isobutylene was carried out in a quartz reactor at $-40°$ C without auxiliary solvent. Vanadium chloride (Group IV) and calcium hydride were used as the catalyst components. The reaction mixture was irradiated, 30 minutes after dosing of the catalyst components, with a mercury discharge lamp (250 Watt) for 5 seconds. The reaction was stopped 10 minutes after irradiation was commenced and the yield of polymer was 79%. The consumptions of the catalyst components were $4.4 \times 10^{-5}$ mole of $VCl_4$ and $1.2 \times 10^{-4}$ mole of $CaH_2$. The molecular weight was 243,000.

EXAMPLE VI

Polymerization of 24 grams of isobutylene was carried out without auxiliary solvent at −40° C. Vanadium chloride (Group IV) and lithium hydride were used as the catalyst components. The reaction mixture was irradiated with an infrared radiator (250 Watt) during polymerization. The polymerization was stopped after 30 minutes by an addition of 0.5 ml of ethanol. The yield of polymer was 83%. The consumptions of the catalyst components were $5.86 \times 10^{-5}$ mole of $VCl_4$ and $1.3 \times 10^{-4}$ mole of LiH. The molecular weight of the polymer was 231,000.

EXAMPLE VII

Polymerization of 23 grams of isobutylene was carried out without auxiliary solvent at −40° C in the daylight. Vanadium (Group IV) chloride and potassium hydride were used as the catalyst components. After 15 minutes the polymerization mixture was illuminated with a 500 Watt electric lamp for 5 seconds and 10 minutes after illumination was commenced the reaction was stopped by addition of ethanol and the yield of polymer was 92%. The consumptions of the catalyst components were $5.86 \times 10^{-5}$ mole of $VCl_4$ and $1.7 \times 10^{-4}$ mole of KH. The molecular weight of the polymer was 200,000.

EXAMPLE VIII

Polymerization of 24 grams of isobutylene was carried out without auxiliary solvent at −40° C in daylight. Vanadium (Group IV) chloride and magnesium hydride were used as the catalyst components. After 25 minutes the polymerization was stopped by the addition of 0.5 ml of ethanol and the yield of the polymer was 73%. The consumptions of the catalyst components were $5.86 \times 10^{-5}$ mole of $VCl_4$ and $1.5 \times 10^{-4}$ mole of $MgH_2$. The molecular weight of the polymer was 265,000.

EXAMPLE IX

Polymerization of 25 grams of isobutylene was carried out without auxiliary solvent at −40° C. Vanadium (Group IV) chloride and barium hydride were used as the catalyst components. The polymerization mixture was illuminated, 20 minutes after dosing of the catalyst components, with a 500 Watt electric bulb for 5 seconds. The reaction was stopped 10 minutes later by the addition of ethanol and the achieved yield of the polymer was 82%. The consumptions were $4.4 \times 10^{-5}$ mole of $VCl_4$ and $1.4 \times 10^{-4}$ mole of $BaH_2$. The molecular weight of the polymer was 250,000.

EXAMPLE X

Isobutylene (24 grams) was polymerized in the absence of an auxiliary solvent at −40° C. Titanium tetrachloride and strontium hydride were used as the catalyst components. After dosing of the catalyst components the reaction mixture was illuminated with a 500 Watt electric lamp for 30 minutes. The polymer separated from the monomer as a white insoluble precipitate during illumination. The reaction was then stopped with ethanol and the conversion to polymer was 30%. The consumptions of the catalyst components were $1.8 \times 10^{-4}$ mole of $TiCl_4$ and $3.8 \times 10^{-4}$ mole of $SrH_2$. The polymer had a molecular weight of 355,000.

EXAMPLE XI

Isobutylene (25 grams) was polymerized in the absence of an auxiliary solvent at −40° C. The reaction mixture was illuminated for 20 minutes after dosing of the catalyst components with a 500 Watt electric lamp for 5 seconds. The reaction was stopped after 150 minutes by the addition of alcohol. The following were used as catalyst components and the consumption thereof, molecular weight and yield of polymer was:

i. Vanadium chloride (consumption $5 \times 10^{-5}$ mole) and lithium borohydride (consumption $2.2 \times 10^{-4}$ mole). The molecular weight of the resulting polymer was 170,000 and the yield was 80%.

ii. Vanadium chloride (consumption $4.49 \times 10^{-5}$ mole) and sodium borohydride (consumption $2.15 \times 10^{-4}$ mole). The molecular weight of the resulting polymer was 184,700 and the yield was 84%.

iii. Vanadium chloride (consumption $6.3 \times 10^{-5}$ mole) and potassium borohydride (consumption $2.1 \times 10^{-4}$ mole). The molecular weight of the resulting polymer was 180,000 and the yield was 88%.

iv. Vanadium chloride (consumption $5.5 \times 10^{-5}$ mole) and magnesium borohydride (consumption $3 \times 10^{-4}$ mole). The molecular weight of the resulting polymer was 210,000 and the yield was 75%.

v. Vanadium chloride (consumption $5 \times 10^{-5}$ mole) and copper borohydride (consumption $2 \times 10^{-4}$ mole). The molecular weight of the resulting polymer was 150,000 and the yield was 78%.

vi. Vanadium chloride (consumption $5.2 \times 10^{-5}$ mole) and zinc borohydride (consumption $1.8 \times 10^{-4}$ mole). The molecular weight of the resulting polymer was 179,000 and the yield was 85%.

EXAMPLE XII

Polymerization of 25 grams of isobutylene was carried out in the absence of an auxiliary solvent at −40° C. The reaction mixture was illuminated for 25 minutes after dosing of the catalyst components with a 500 Watt electric lamp for 5 seconds and the reaction was stopped 1 hour after illumination was begun by the addition of alcohol. The following were used as the catalyst components and the consumption thereof, molecular weight and yield of polymer was:

i. Vanadium chloride (consumption $5.86 \times 10^{-5}$ mole) and calcium-aluminium hydride (consumption $2.1 \times 10^{-4}$ mole). The molecular weight of the resulting polymer was 20,000 and the yield was 75%.

ii. Vanadium chloride (consumption $5.9 \times 10^{-5}$ mole) and magnesium-aluminium hydride (consumption $3.15 \times 10^{-4}$ mole). The molecular weight of the resulting polymer was 240,000 and the yield was 78%.

EXAMPLE XIII

Copolymerization of isobutylene and styrene was carried out at −40° C without auxiliary solvent. The mixture of monomers consisted of 26 grams of isobutylene and 2.6 grams of styrene. Vanadium chloride (consumption $5.86 \times 10^{-5}$ mole) and sodium hydride (consumption $1.18 \times 10^{-4}$ mole) were used as the catalyst components. The reaction mixture was illuminated after 1 hour with a 500 Watt electric lamp for 5 seconds and 10 minutes later the reaction was stopped by the addition of alcohol. The yield of polymer was 26% which had a molecular weight 190,000.

EXAMPLE XIV

Copolymerization of isobutylene and styrene was carried out without auxiliary solvent at −40° C. The mixture of monomers consisted of 29 grams of isobutylene and 2.9 g of styrene. Vanadium chloride (consumption $5.86 \times 10^{-5}$ mole) and magnesium hydride (consumption $3 \times 10^{-4}$ mole) were used as the catalyst components. The reaction was stopped after 1 hour by the addition of alcohol and there was a 14% conversion to polymer which had a molecular weight 186,000.

EXAMPLE XV

Isobutylene was copolymerized with styrene in the absence of an auxiliary solvent at −40° C. The monomer mixture consisted of 22 grams of isobutylene and 2.2 grams of styrene. Titanium tetraiodide (consumption $1.5 \times 10^{-4}$ mole) and beryllium hydride (consumption $4 \times 10^{-4}$ mole) were used as the catalyst components. The reaction mixture was illuminated after 25 minutes of polymerization with a 500 Watt electric lamp for 5 seconds and 20 minutes later the reaction was stopped by the addition of alcohol. There was a 16.5% conversion to copolymer which had a molecular weight of 90,000.

EXAMPLE XVI

Polymerization of a 30% (w/w) solution of styrene in n-heptane was catalyzed by Vanadium chloride (consumption $1.2 \times 10^{-4}$ mole) and sodium hydride (consumption $4 \times 10^{-4}$ mole) at −50° C. The reaction was accelerated by illumination with a 200 Watt electric lamp for 1 hour after the catalyst components were dosed. The polymer precipitated from the solution during illumination as a powder. The reaction was stopped by the addition of alcohol and there was a conversion to polymer of 50%.

EXAMPLE XVII

Isobutylene and isobutyl vinyl ether were copolymerized in the absence of auxiliary solvent at the temperature −40° C. Titanium tetrabromide (consumption $1.5 \times 10^{-4}$ mole) and zirconium hydride (consumption $3 \times 10^{-4}$ mole) were used as the catalyst components. The mixture of monomers consisted of 25 g of isobutylene and 5 grams of isobutyl vinyl ether. The copolymerization was accelerated by illumination with a 200 Watt electric lamp for 1 hour after the catalyst components were dosed and was stopped by the addition of alcohol and there was a conversion to copolymer of 12% which had a molecular weight of 120,000.

EXAMPLE XVIII

Isobutylene was copolymerized with α-methylstyrene in the absence of auxiliary solvent at −40° C. Vanadium chloride (consumption $5.8 \times 10^{-5}$ mole) and sodium hydride (consumption $1.2 \times 10^{-4}$ mole) were used as the catalyst components. The reaction mixture contained 25 g of isobutylene and 2.5 grams of α-methylstyrene. The reaction was stopped 1 hour after dosing of the catalyst components by the addition of ethanol and there was a conversion of 37% to copolymer which had a molecular weight 170,000.

EXAMPLE XIX

Polymerization of 24 grams of isobutylene was carried out without auxiliary solvent at −40° C. Vanadium chloride (consumption $5.8 \times 10^{-5}$ mole) and the alloy consisting of 2 parts of potassium and 1 part of sodium (consumption 0.05 ml) were used as the catalyst components. The reaction was stopped after 10 minutes by the addition of alcohol and there was a 37.5% conversion to polymer which had a molecular weight of 330,000.

EXAMPLE XX

Polymerization of 25 grams of isobutylene was carried out without auxiliary solvent at −40° C. Vanadium chloride (consumption $5.8 \times 10^{-5}$ mole) and lithium suspension in heptane (consumption $4 \times 10^{-4}$ mole) were used as the catalyst components. The polymerization mixture was illuminated after dosing of the catalyst components with a 200 Watt electrical lamp for 5 seconds and the reaction was stopped after 20 minutes by the addition of alcohol and there was a 55% conversion to polymer which had a molecular weight of 300,000.

EXAMPLE XXI

Polymerization of 24 grams of isobutylene was carried out in the absence of auxiliary solvent at −40° C. The reaction mixture was illuminated, 20 minutes after dosing of the catalyst components, with a 500 Watt electric lamp for 5 seconds. The reaction was stopped 60 minutes after illumination by the addition of alcohol. The catalyst components, consumption thereof, yield and molecular weight of the resulting polymers were as follows:

i. Vanadium chloride (consumption $5.2 \times 10^{-5}$ mole) and a sodium amalgam containing 13% of sodium (consumption 0.05 g). The polymer had a molecular weight of 250,000 and the yield of 50%.

ii. Vanadium chloride (consumption $5.2 \times 10^{-5}$ mole) and potassium amalgam containing 10% of potassium (consumption 0.08 g). The polymer had a molecular weight of 260,000 and the yield was 58.5%.

iii. Vanadium chloride (consumption $5.2 \times 10^{-5}$ mole) and rubidium amalgam containing 15% of rubidium (consumption 0.06 g). The polymer obtained had a molecular weight of 230,000.

EXAMPLE XXII

Isobutylene was copolymerized with butadiene without auxiliary solvent at −40° C. The monomer mixture consisted of 23 grams of isobutylene and 3 grams of butadiene. Vanadium chloride (consumption $5.8 \times 10^{-5}$ mole) and 0.05 g of the sodium wire were used as the catalyst components. The polymerization mixture was illuminated after dosing of the catalyst components with a 500 Watt electric lamp for 5 seconds and the reaction was stopped after 90 minutes by the addition of alcohol. There was a 69% conversion to copolymer which had molecular weight of 556,840.

EXAMPLE XXIII

Isobutylene was copolymerized with butadiene at −40° C without auxiliary solvent. The mixture of monomers consisted of 20 grams of isobutylene and 2 grams of butadiene. Vanadium chloride (consumption $5.86 \times 10^{-5}$ mole) and the sodium hydride suspension in n-heptane ($1.8 \times 10^{-4}$ mole) were used as the catalyst components. The polymerization mixture was illuminated with a 200 Watt electric lamp for 10 minutes after the catalyst components were dosed. The reaction was stopped after 60 minutes by an addition of alcohol. There was a conversion to copolymer which had a molecular weight of 618,800.

EXAMPLE XXIV

Isobutylene was copolymerized with butadiene at −40° C without auxiliary solvent. The monomer mixture consisted of 22 g of isobutylene and 3.5 grams of butadiene. Vanadium chloride ($5.86 \times 10^{-5}$ mole) and 0.045 g of an alloy containing 1 part of sodium and 2 parts of potassium were used as the catalyst components. The reaction mixture was illuminated for 5 seconds after dosing of the catalyst components with a 500 Watt electric lamp. The reaction was stopped after 15 minutes by the addition of alcohol. There was a 71% conversion to copolymer which had a molecular weight of 557,000. The copolymer contained 2.1% of double bonds and was easily vulcanizable by means of vulcanization agents commonly employed for butyl rubber.

EXAMPLE XXV

Isobutylene was copolymerized with butadiene and styrene without auxiliary solvent at −40° C. The mixture of monomers consisted of 22 grams of isobutylene, 2.2 grams of butadiene and 4.2 grams of styrene. The catalyst components used were $5.86 \times 10^{-5}$ mole of Vanadium chloride and $1.2 \times 10^{-4}$ mole of potassium hydride, which was added to the monomer mixture as a suspension in heptane. The reaction mixture was illuminated after the catalyst components were dosed with a 500 Watt electric lamp for 5 seconds and the reaction was stopped 90 minutes later by the addition of alcohol. There was a 62% conversion to terpolymer which had a molecular weight of 430,000.

EXAMPLE XXVI

Isobutylene was copolymerized with 2,3-dimethylbutadiene-1,3 at −40° C in absence of an auxiliary solvent. The mixture of monomers consisted of 24 grams of isobutylene and 2 grams of 2,3-dimethylbutadiene-1,3. Vanadium chloride ($5.86 \times 10^{-5}$ mole) and $1.1 \times 10^{-4}$ mole of lithium hydride, which was used as a suspension in heptane, were dosed into the monomer mixture as the catalyst components. The reaction mixture was then illuminated for 10 minutes with a 200 Watt electric lamp and 75 minutes later the reaction was stopped by the addition of alcohol. There was a 65% conversion to copolymer which had a molecular weight of 350,000.

EXAMPLE XXVII

Isobutylene was copolymerized with isoprene in the absence of auxiliary solvent at −78° C. The mixture of monomers contained 21 grams of isobutylene and 0.6 grams of isoprene. The catalyst components, $1.58 \times 10^{-4}$ mole of titanium tetrachloride and $3.6 \times 10^{-4}$ mole of calcium hydride, were dosed to the reaction mixture which was then illuminated with 200 Watt electric lamp. The reaction was stopped after 40 minutes by the addition of alcohol. There was a 11% conversion to copolymer containing 90% of soluble material. The copolymer had a molecular weight of 330,000.

EXAMPLE XXVIII

Copolymerization of isobutyl vinyl ether and isoprene was carried out in a solution in n-heptane at −40° C. Titanium tetrabromide ($1.6 \times 10^{-4}$ mole) and $2.1 \times 10^{-4}$ mole of sodium borohydride (as a suspension in heptane) were added to 50 grams of the solution containing 16 grams of isobutyl vinyl ether and 5.3 grams of isoprene in n-heptane. The reaction mixture was illuminated with a 500 Watt electric lamp for 10 seconds after dosing the catalyst components and then the reaction was carried out in daylight for 1 hour. The copolymer precipitated from the monomer solution during reaction and a yield of 65% was obtained. It contained 1.7% of double bonds and had an intrinsic viscosity of 1.17.

EXAMPLE XXIX

Isobutyl vinyl ether was copolymerized with butadiene in a toluene solution at −40° C. Into 50 grams of the solution, which contained 15 grams of isobutyl vinyl ether and 5 grams of butadiene, there were added $9.5 \times 10^{-5}$ mole of Vanadium chloride and $3.2 \times 10^{-4}$ mole of sodium hydride (as a suspension in toluene). The reaction mixture was then illuminated with a 200 Watt electric lamp for 60 minutes and the reaction was stopped by the addition of alcohol. The polymer containing 1.9% of double bonds and having an intrinsic viscosity 0.8 was obtained in a yield of 7.8 grams.

EXAMPLE XXX

Isobutylene was copolymerized with chloroprene without auxiliary solvent at −78° C. The monomer mixture consisted of 22 grams of isobutylene and 4.4 grams of chloroprene. Vanadium chloride (consumption $1.8 \times 10^{-4}$ mole) and 0.05 grams of sodium wire were used as the catalyst components. The polymerization mixture was illuminated with a 500 Watt electric lamp for 5 seconds after the catalyst components were dosed. The reaction was stopped by the addition of alcohol after 60 minutes. There was a 45% conversion to copolymer which had a molecular weight of 320,000 and contained 2.48% of chlorine and 1.89% of unsaturated groups.

EXAMPLE XXXI

Isobutylene was copolymerized with chloroprene without auxiliary solvent at a temperature of −40° C, as in EXAMPLE XXX. The monomer charge consisted of 22 g of isobutylene and 4.4 grams of chloroprene. The catalyst components were $1.8 \times 10^{-4}$ mole of vanadium chloride and $1.2 \times 10^{-4}$ mole of calcium hydride. The reaction mixture was illuminated with a 500 Watt electric lamp for 5 seconds and 60 minutes later the reaction was stopped by the addition of alcohol. The copolymer was obtained in a 42% yield, had a molecular weight of 220,000 and contained 1.61% of chlorine and 0.83% of unsaturated groups.

EXAMPLE XXXII

Isobutylene was copolymerized with isoprene in a tetrachloromethane solution of −30° C. Into 50 grams of the solution, which contained 20 grams of isobutylene and 1.5 grams of isoprene there were added $8 \times 10^{-5}$ mole of the catalyst and $3.5 \times 10^{-4}$ mole calcium hydride (as a suspension in toluene). The catalyst was prepared separately by mixing equimolar amounts of vanadium chloride and titanium iodide in tetrachloromethane and was applied as a solution. The copolymerization mixture was then illuminated with a 200 Watt electric lamp for 5 minutes and after the next 30 minutes the reaction was stopped by the addition of alcohol. The copolymer contained 1.6% of double bonds and had a viscosimetric molecular weight of 220,000 and there was obtained a conversion of 76%. In the mixing of vanadium chloride with titanium halides other than chloride, an exchange reaction takes place between the halides and mixed chloro-halides of the metals result. Both titanium chlorohalides and vanadium chloro-halides present in the mixture act as catalysts for the polymerization.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should be comprehended within the meaning and range of equivalence of the following claims.

What is claimed is:

1. A process for the controlled polymerization and copolymerization of monoolefinic and diolefinic monomers which are polymerizable by a cationic mechanism comprising initiating the polymerization reaction with a system comprising at least one halide selected from the group consisting of tetravalent vanadium, titanium and zirconium halides in the presence of at least one activating agent selected from the group consisting of alkali metals, alkaline earth metals, amalgams thereof, and the hydrogen compounds of the metals of Groups I, II, III and IV of the Periodic Table for said halide and accelerating and controlling the reaction by irradiation.

2. A process as defined in claim 1 wherein polymerization is carried out at temperatures in a range of 0° C. to −140° C.

3. A process as defined in claim 1 wherein the molecular ratio of the metal halide to the activating agent is in a range from 100 to 0.01 part metal halide to 1.0 part activating agent.

4. A process as defined in claim 1 wherein the rate of polymerization is controlled by dosing the catalyst components and by the intensity of the irradiation.

5. A process as defined in claim 1 wherein the source of the irradiation is light.

6. A process as defined in claim 1 wherein the monoolefinic monomer is isobutylene and the diolefinic monomer is butadiene.

* * * * *